UNITED STATES PATENT OFFICE.

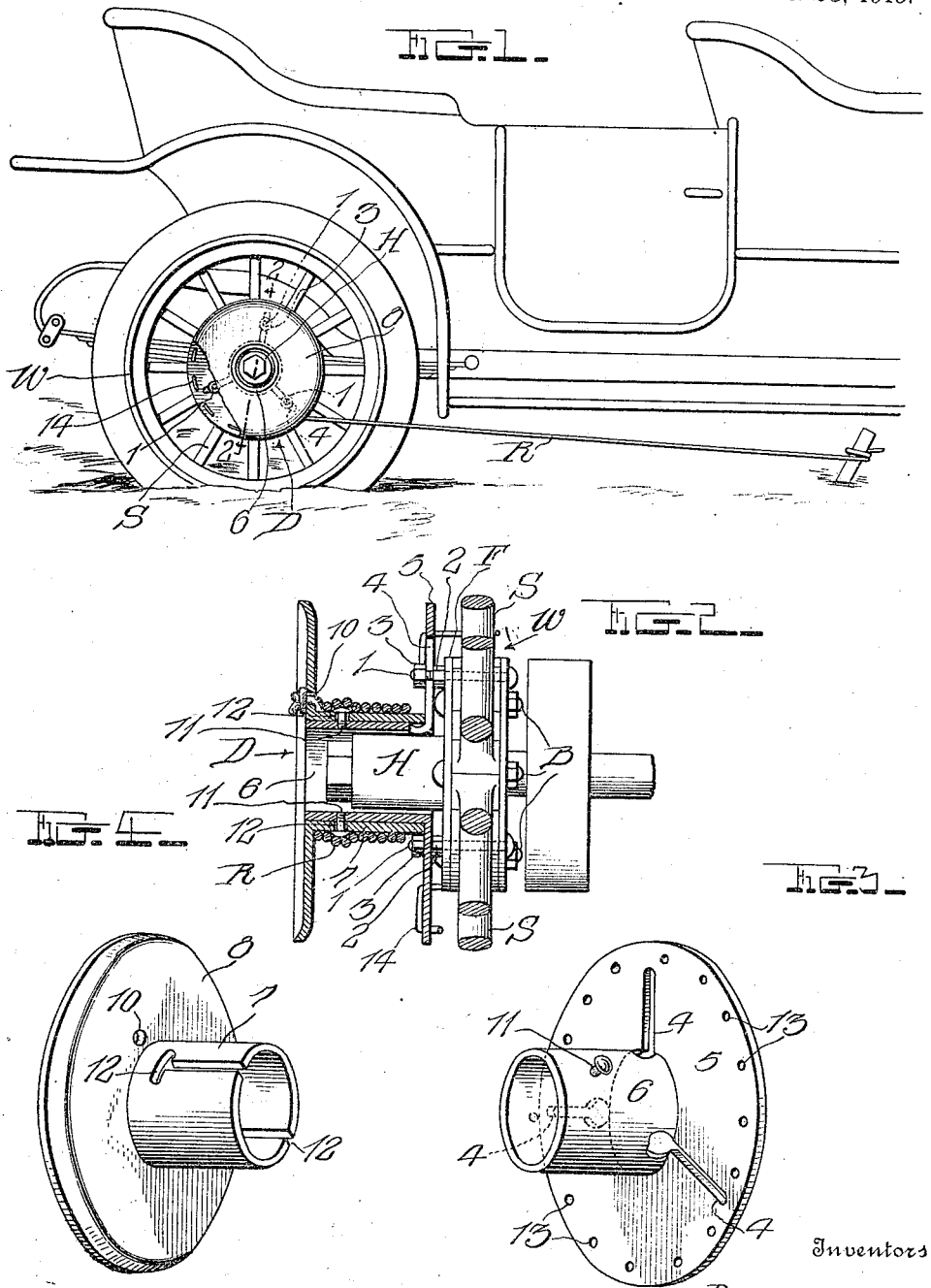

ROBERT S. JAMES, DOW M. ANDERSON, AND PATRICK V. ALLEN, OF SEATTLE, WASHINGTON.

WINDLASS ATTACHMENT FOR AUTOMOBILES.

1,165,510.  Specification of Letters Patent.  Patented Dec. 28, 1915.

Application filed February 25, 1915. Serial No. 10,485.

*To all whom it may concern:*

Be it known that we, ROBERT S. JAMES, DOW M. ANDERSON, and PATRICK V. ALLEN, citizens of the United States, residing at Seattle, in the county of King and State of Washington, have invented certain new and useful Improvements in Windlass Attachments for Automobiles; and we do declare the following to be a full, clear, and exact description of the invention, such as will enable others skilled in the art to which it appertains to make and use the same.

Our invention relates broadly to improvements in automobile accessories and more particularly to drums or windlasses for attachment to the rear wheels thereof.

The main object of the invention is to improve upon devices of this character to such an extent, as to provide a very simple yet highly efficient device which may be quickly and easily attached to or detached from the drive wheels of a machine.

To this end, a further object is to construct the drum in two sections, one of which may be either permanently or removably secured to the wheel, while the other section is detachably secured to the aforesaid section, this being advantageous since the removable section may be much more quickly and easily detached from the fixed section, than the latter can be removed from the wheel.

A still further object is to so construct the attachment as to allow it to be readily applied to wheels having hub flanges of different sizes.

With the above objects in view, the invention resides in certain novel features of construction and combination hereinafter described and claimed.

In describing the invention, we shall refer to the accompanying drawings wherein like reference characters designate corresponding parts throughout the various figures and wherein:

Figure 1 is a side elevation of a portion of an automobile, showing the application of the invention thereto; Fig. 2 is a vertical transverse section as seen along the plane indicated by the line 2—2 of Fig. 1; Fig. 3 is a perspective view of the inner section of the drum; and Fig. 4 is a similar view of the outer section thereof.

In these drawings, constituting a part of the application, W designates one of the rear drive wheels of an automobile, said wheel including the usual spokes S and hub H, the latter having at its inner end the usual annular spoke clamping flange F, which coacts with a similar flange on the inner end of the hub H, to retain the spokes in position. In constructing most automobile wheels, and in fact, all of such wheels employing wooden spokes, a plurality of bolts B are passed through the two spoke clamping flanges and through the intervening spokes, for the purpose of drawing said flanges into binding contact with the opposite sides of the latter.

As one simple and efficient manner of securing the drum D, wherein resides the gist of the present invention, to the wheel, certain of the bolts B are removed and longer bolts 1 are substituted therefor, the heads of these bolts being disposed in contact with the inner clamping flange, while the outer ends thereof project considerable distances from the flange F, are provided with inner clamping nuts 2 which abut said flange, and with additional outer nuts 3. The portions of the bolts 1 between the nuts 2 and 3 are received by radially extending slots 4 formed in an annular flange 5 which projects laterally from the inner end of a sleeve or additional hub member 6 which surrounds the hub H previously described. It will therefore be seen that tightening of the nuts 3 will rigidly secure the flange 5 and the sleeve 6 in position upon the wheel, while the removal of said nuts will allow said flange and sleeve to be detached. In most cases, however, it is preferred to affix these parts permanently to the wheel, since if they are properly painted and ornamented, they do not detract in any manner from the appearance of the car.

Loosely and removably surrounding the sleeve 6 is an additional sleeve 7 whose outer end is provided with an annular laterally extending flange 8 whose edge is preferably deflected outwardly as seen in Fig. 2, for the purpose of preventing cutting of the rope or cable R which is adapted to be wound upon the drum and to have one of its ends anchored in an opening 10 formed in the flange 8.

Since it becomes expedient to provide some simple detachable connection between the two sleeves 6 and 7, and since studs 11 carried by the sleeve 6 and angular slots 12 formed in the sleeve 7, will effectively accomplish the desired results, we prefer to employ this form of detachable connection between the two sleeves, although it will be evident that other means could be employed for this purpose.

By reference to the drawings, it will be seen that the angular slots 12 are T-shaped and that the longitudinally extending portions thereof open through the inner end of the sleeve 7, thus allowing the studs 11 to be readily received in said slots when the outer drum section is positioned on the inner section. After forcing the sleeve 7 upon the sleeve 6, it will be evident that slight rotation of the former, will position the studs in the transversely extending portions of the slots 12, thus positively preventing the outer section from being detached until it is again rotated in the proper direction.

In addition to the numerous features above described, the flange 5 is preferably provided with an annular series of openings 13 through which a lace 14, formed of cat gut or other tough material, may be passed, this lace being employed as additional means for securing said flange to the wheel, it being evident from the drawings that said lace is passed around the spokes S and through the openings 13. It will be obvious however, that if it is found that such lace is not necessary, it may be dispensed with.

In applying the device to use, the outer section of the drum or windlass, which is normally carried within the vehicle, is removed therefrom and is positioned upon the inner section in the manner previously set forth. One end of the rope R is now anchored within the opening 10, while the other end thereof is led forwardly or rearwardly from the vehicle and is secured to a stake, tree, or other rigid object. It therefore follows that as the wheel W is rotated by operation of the motor, the rope will be wound upon the sleeve 7, thus drawing the machine forwardly or rearwardly as the case may be. When the winding attachment is no longer needed, the outer section may be removed with the rope wound thereon, and may be again stored in the body of the machine for future use.

Although it will be understood that the invention is designed primarily for use in pulling machines out of mud holes, and up steep grades, by providing a drum upon the hub of each rear wheel, and by securing the ropes R to an overhead support, these drums could be used as means for raising the rear end of the vehicle for the purpose of making repairs. It will likewise be evident, that although but one of the attachments is shown in the drawings, and that the same will operate to advantage for removing the vehicle from mud holes and the like, two of said attachments could well be used by positioning one on each wheel, in which case, the differential of the machine is allowed to operate more readily for producing the necessary results.

From the foregoing description, taken in connection with the accompanying drawings, it will be evident that a very simple attachment has been provided for carrying out the objects of the invention, yet that the same will be very efficient in operation.

We claim:

1. The combination with an automobile wheel, of a sleeve surrounding the hub thereof and having an annular flange at its inner end secured to said wheel, an additional sleeve telescopically engaged with the aforesaid sleeve and having an annular flange on its outer end, one of said sleeves having an angular slot opening through the end remote from its flange, and a stud on the other sleeve received by said slot.

2. The combination with an automobile wheel and a cylindrical axially disposed member projecting axially therefrom, of a sleeve member telescopically engaged with the aforesaid member and having an annular flange on its outer end, one of said members having an angular slot opening through one of its ends, and a stud projecting radially from the other member and removably received by said slot.

In testimony whereof we have hereunto set our hands in presence of two subscribing witnesses.

ROBERT S. JAMES.
DOW M. ANDERSON.
PATRICK V. ALLEN.

Witnesses:
EMIL KOSKI,
LEO BRONSON.